Nov. 27, 1962  I. IBANEZ ET AL  3,066,199
PSEUDO-STEREOPHONIC DISTRIBUTOR FOR CINEMATOGRAPH REPRODUCTIONS
Filed Sept. 4, 1959  2 Sheets-Sheet 1
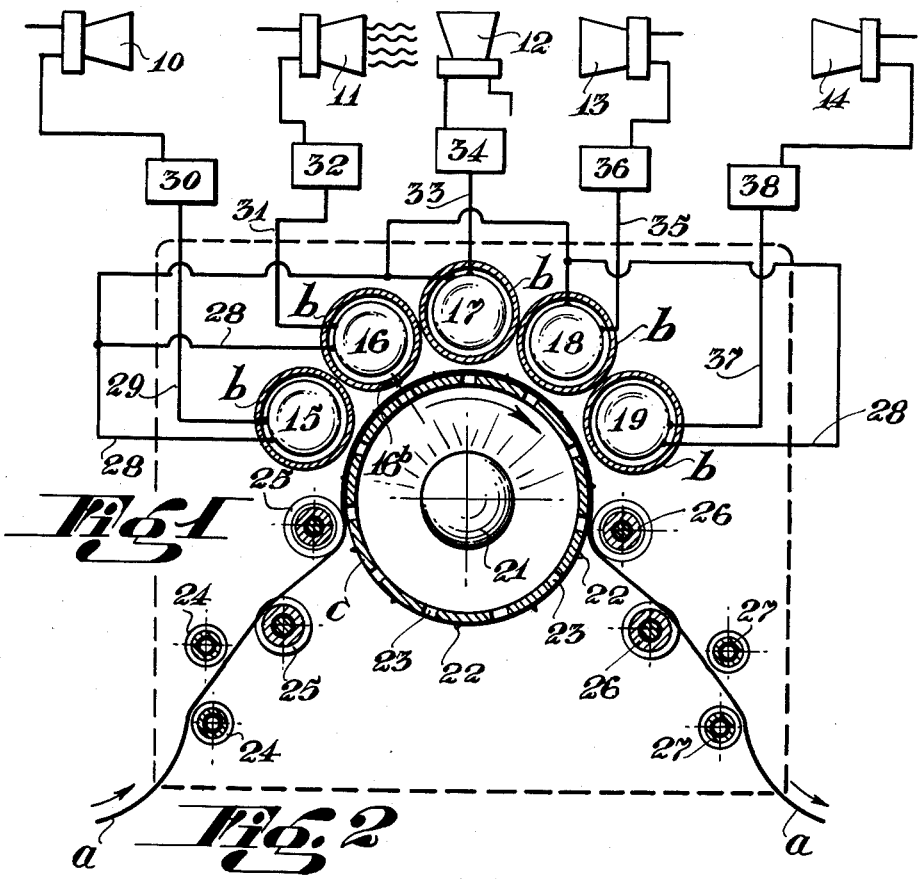
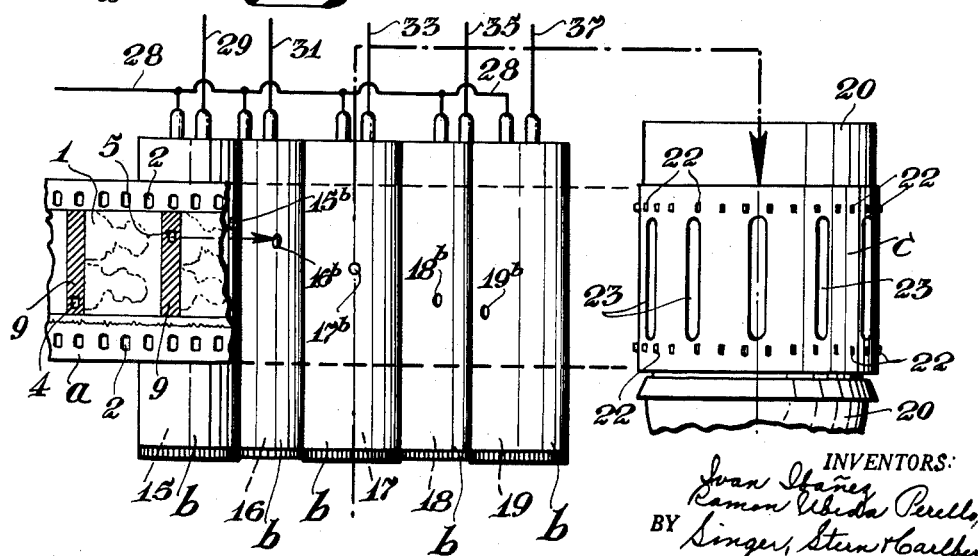
INVENTORS:
Juan Ibañez
Ramon Ubeda Perello
BY Singer, Stern & Carlberg
Attorneys.

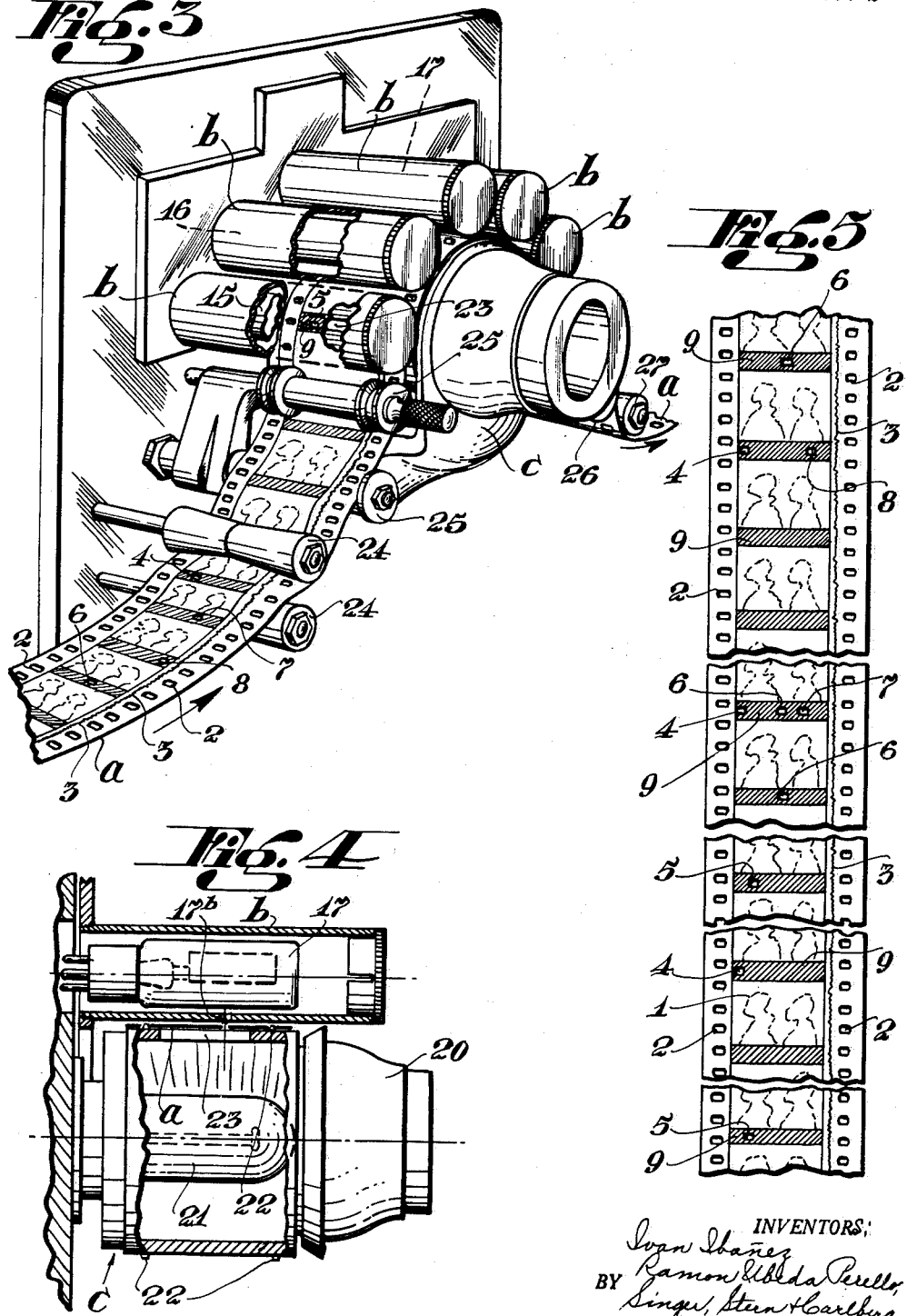

United States Patent Office 3,066,199
Patented Nov. 27, 1962

3,066,199
PSEUDO-STEREOPHONIC DISTRIBUTOR FOR
CINEMATOGRAPH REPRODUCTIONS
Ivan Ibanez, Diagonal Roque Sanez Pena 555, Buenos
Aires, and Ramon Ubeda Perello, Callao Street 292,
Buenos Aires, Argentina
Filed Sept. 4, 1959, Ser. No. 838,199
3 Claims. (Cl. 179—100.3)

The present application is a continuation-in-part of application Serial No. 642,042, filed February 25, 1957, now Patent No. 2,967,912.

The instant invention refers to a pseudo-stereophonic distributor for cinematographic reproductions and more particularly to a new system of sound selection, operated by optical means, in response to signals provided at suitable positions on the cinematographic film and which therefore presents an ideal method for cinematographic projections.

The films used in the "Cinemascope" have several sound tracks whereon the sound is registered photographically and these tracks run along the edges of the film, between the photo frames and the perforations of the film; the transmitter to the loud-speakers being somewhat complicated and the necessary auxiliary unit being almost as costly as the projector itself.

The commutation signals of the instant invention consist of small, transparent areas, arranged at suitable positions in the opaque spaces between the frames of the film and the sound is carried in a single sound-track, just as in an ordinary sound film, there being no necessity for special equipment, apart from that for marking (or photographing) the signals which effect the changes of loud-speakers said marking being registered during the actual filming operation.

The above mentioned signals are so positioned on the film that they coincide with similarly dimensioned openings arranged in the individual housings of a plurality of photo-electric cells, which cells are separately exposed to activation by the light from a centrally placed lamp enclosed in a slotted drum provided with standard sprocket-wheel teeth, over which the film is made to pass, whereby corresponding relay circuits are opened or closed to control the specially positioned loud-speakers distributed around the theater and stage for accurate pseudo-sterephonic reproduction of the sound.

There are several additional objects of this invention, among which may be cited the advantage of being able to obtain cinemascopic results using the ordinary single sound-track apparatus and that of having a relatively simple distributor consisting of a slotted drum over which the film is made to pass and at least five separately housed photo-electric cells surrounding same.

Greater fidelity in the reproduction of sound is obtained by using a phonogram carried in a single sound-track, printed on the film by microphones actually situated in the different calculated positions on the stage, so as to reproduce the sound from the identical direction at which it was produced during the taking of the picture.

Yet another object is the economy effected by the provision of a cinema projector using single sound-track film and of correspondingly simple installation.

Further objects of the instant invention will become apparent in the course of this specification, which is illustrated by a set of drawings in which:

FIG. 1 is a schematic, sectional view of the distributor, showing how a selective signal on the film a is arranged to coincide with the predetermined opening 16b in the housing of the corresponding cell 16 so as to allow the light from the lamp 21 to pass into the cell 16 and excite the relay operating the circuitbreaker 32 controlling the loud-speaker 11, the position of which is most suitable for the reproduction of this particular phase of sound.

The loud-speakers are shown schematically at 10—11—12—13 and 14 with their respective connections to the photo-electric cells 15—16—17—18 and 19, through the circuit breakers 30—32—34—36 and 38 and controlling relays, one conductor or lead, 28 of the circuit of all five photo-electric cells being common to all five relays.

FIG. 2 shows the battery of photo-electric cells with the rotatable drum 20 displaced for greater clarity and illustrates the different dispositions of the individual openings in the housings of the cells, which openings correspond to the respectively positioned signal producing areas 4 etc. provided in the spaces 9, between the frames on the film a.

The rotatable drum 20, is shown with sprocket teeth 22, for fitting into the perforations on the film and is provided with slots 23, spaced so as to coincide with the expose the whole length of the spaces between the frames of the picture on the film.

FIG. 3 is a view in perspective of the pseudo-stereophonic distributor of this invention, showing how a film, when passing between the drum 20 and the five photo-electric cells 15 to 19, presents the signal transparencies 4 to 8 to one or the other of the cells exclusively and thereby produces the correspondingly directed effect by the respective loud-speaker 10 to 14 inclusive in the auditorium.

FIG. 4 shows a section of part of the distributor, showing the activating lamp 21 and one of the photo-electric cells 17 when receiving a beam of light from the lamp 21 due to coincidence between the corresponding selective signal on the film through the opening 17b; and FIG. 5 illustrates a fragment of film arranged to show the signals used in the instant invention in the opaque spaces between frames and how they correspond to the different cells as already described.

In the attached drawings the same reference numbers indicate the same or corresponding parts and the various elements are indicated by letters.

As may be seen in the drawings, a is a cinematographic film bearing the usual photo-frames 1 and opaque spaces 9 therebetween, provided with the standard perforations 2 at both sides near the edges and, as this is to be used as Cinemascope film, it carries a sound-track 3 impressed along one side between the photos 1 and the perforations 2 by which the sound is recorded, but with the peculiarity in this case that there is one, single sound-track only and this track is recorded in combination with the selective signals 4, 5, 6, 7 and 8, which can be seen as transparent areas forming control actuating marks, or contrasting spaces, disposed in five predetermined positions along the opaque space 9 that separates the individual pictures on the film a.

These control actuating marks, 4, 5, 6, 7 and 8 are produced on the film photographically by means of five different microphones disposed in suitable positions around and above the stage, so that each sound will be reproduced correctly in the auditorium when the film is shown.

The positions of the five loud-speakers in the theater must, therefore, correspond to the positions of the five microphones used to impress the selective signals on the film and the result is a perfect pseudo-stereophonic rendering of the sounds that were produced on the stage during filming.

The photo-electric cells 15, 16, 17, 18 and 19 of the distributor shown in FIGS. 1 to 4 are separately housed, each of said housings having respective orifices 15b, 16b, 17b, 18b and 19b that allow a restricted passage of light from the lamp contained in the drum 20 whenever one of the selective control actuating marks, 4, 5, 6, 7 or 8 on the film *a* corresponds with one of the said orifices upon passage of the film on the rotating drum 20.

Said drum 20 is hollow and contains the lamp 21, the light of which activates the individual photo-electric cells. This drum 20 is provided with standard sprocket teeth 22 that fit into the perforations of the film and has a series of slots 23 spaced in parallel around its periphery in coincidence with the spaces 9, between frames on the film.

The drum 20 is furthermore provided with roller guides 24, 25, 26 and 27 which guide the film onto and off said drum and are biassed by adequate springs.

As will be seen in FIGS. 1 and 3, the photo-electric cells 15, 16, 17, 18 and 19 are separately enclosed in housings *b* and are spaced in parallel around the periphery of the drum 20 so that their respective openings 15*b* to 19*b* coincide with the slots 23 provided in the drum and that, when a film bearing the selective control actuating marks passes between the drum 20 and the housings of the five cells, the said marks will coincide with the openings 15*b* to 19*b* in the housing of the respective photo-electric cells.

The selective control actuating mark 4 on the film *a* coincides with the opening 15*b* in the housing of cell 15, which cell is in circuit with the loud-speaker 10. Signal 5 coincides with opening 16*b* of cell 16, which is in circuit with loud-speaker 11; control activating mark 6 coincides with opening 17*b* in the housing of cell 17 connected to loud-speaker 12; control actuating mark 7 coincides with opening 18*b* in the housing of cell 18 in circuit with loud-speaker 13 and finally, control actuating mark 8 coincides with opening 19*b* in the housing of cell 19 in circuit with loud-speaker 14.

All five of the photo-electric cells have one of their terminals connected together by a common conductor 28 and each cell has its other terminal connected separately to one of the five relays controlling the circuit-breakers or relays 30 to 38 inclusive, by leads 29, 31, 33, 35 and 37.

The other terminals of the loud speakers and the conductor 28 of the photo-electric cells are connected in an approved manner to the terminals of an ordinary sound pick-up device presented to the sound track of the film *a* similar to that shown and described in my co-pending application Serial Number 642,042.

*Operation*

The loud-speakers 10, 11, 12, 13 and 14, are preferably fixed at suitable positions at the sides, center and well back behind the screen, and high above the center of the auditorium, the latter being the most suitable place from which the sounds known as "high," namely storms, airplanes etc. are reproduced.

Apart from the customary threading of the film through the projector it also has to be threaded through the distributor described in this specification, as shown in FIGS. 1 and 3, and, when passing around the drum 20, it must be set so that the opaque spaces between frames on the film coincide with the slots in the periphery of the drum, whereby the transparent signals 4, 5, 6, 7 and 8, which lie on the said opaque spaces will allow the light from the lamp 21 inside the drum 20 to pass to the respective photo-electric cell and, by activating same, operate the circuit of the corresponding loud-speaker as requisite.

Thus, for example, when the signal producing area 5 is positioned as shown in FIG. 2, it will correspond to the opening 16*b* in the housing of the photo-electric cell 16, which cell will become excited and thereby operate the relay of the circuit-breaker 32, controlling the loud-speaker 11.

According to the action and sound registered on the film, as soon as the position of loud-speaker 11 no longer corresponds to the direction of the sound, another control actuating mark 5, consisting of another transparent area provided in the opaque space between two frames permits the passage of a beam of light from the lamp 21 through the opening 16*b*, in the housing of the photo-electric cell 16, whereby said cell again operates the relay 32, causing same to break the circuit of loud-speaker 11.

It will be seen that the five loud-speakers can be made to operate conjointly, separately or alternately, so as to reproduce the sounds pseudo stereophonically, corresponding to the original filming microphones and with due adjustment of volume and distance as well as direction.

It is to be understood that, within the scope of the appended claims, various modifications in detail and structure may be made without departing from the objects or principles of the invention herein described.

We claim:

1. Pseudo-stereophonic localizer for a plurality of loud speakers distributed at different locations in a theater adapted to be employed with cinematographic sound films having a single sound track and sprocket feed openings, a rotary feed drum for said films having teeth to engage said openings, said drum being provided with a series of circumferentially spaced slots, said film being provided with selective control actuating marks in the spaces between individual frames on the film adapted to register with the slots in said feed drum, a plurality of housings surrounding said drum and arranged in spaced circumferential relation with respect to said drum, a photo-cell in each housing, electric circuits connecting said cells in parallel with the various loud speakers in said theater, said housings being provided with offset orifices to permit the passage of light rays, and means in said drum for projecting a ray of light through said control actuating marks and onto a pre-selected photocell whereby each of said photoelectric cells is adapted to be activated by a beam of said illuminating means, the light from which is controlled by said actuating marks passing said orifices which are offset and relatively displaced from each other so that each one corresponds to one of said selective control actuating marks, said control actuating marks consisting of a transparent area in the space between the frames of the film, and said slots in said drum being spaced an angular distance equal to the linear spacing of said control actuating marks.

2. Pseudo-stereophonic localizer for a plurality of loud speakers distributed at different locations in a theater adapted to be employed with cinematographic sound films having sprocket feed openings and a single sound track with control actuating marks thereon, a plurality of loud speakers mounted in a theater, a plurality of control switches for said speakers, circuits for said switches, a plurality of photo-electric cells connected in said circuits to control said switches in the circuits of the various loud speakers distributed in the theater, a revolving drum having teeth to engage said film and having a series of circumferentially spaced slots therein, a plurality of housings for each of said photo-electric cells to separately enclose each cell, said housings being arranged around the periphery of said drum and being provided with offset orifices for the admission of light rays, a light source mounted in said drum to direct an actuating beam of light toward said photo-electric cells when a light beam passes through a slot in said drum and one of said control actuating marks in registry with one of the orifices in one of said housings, the slotted openings in said drum being spaced an angular distance equal to and corresponding with the spaces between the frames of the film, and the orifices in said housing of the photo-electric cells being offset axially from each other, whereby each orifice coincides with a particular selective control actuating mark formed by a transparent area disposed partially across the space between any two frames of the photographic film.

3. A pseudo-stereophonic localizer for a plurality of loud speakers distributed at different locations in a theater adapted to be employed with a cinematographic sound film having a single sound track with sprocket openings and a series of control actuating marks, a revolving drum, said drum being provided with a series of circumferentially spaced slots, housings arranged in spaced relation around said drum, a photo-electric cell mounted in each housing, the housings being arranged to permit the passage of film between the drum and housing and over said drum, circuits for said photo-cells, relay switches mounted in said circuit adapted to control the various loud speakers throughout the theater, a light source in said drum for directing light in a direction toward said photo-electric cells, said housings being provided with an offset orifice through which light from said light source can pass when pre-arranged transparent areas provided in the spaces between the frames of the film traverse said drum, the control markings in the spaces between picture frames being spaced a linear distance equal to the circumferential spacing between the slotted openings in the drum, and the orifices in said cell housings being offset and spaced so that each of said orifices corresponds to one of the positions of a control actuating mark.

References Cited in the file of this patent

UNITED STATES PATENTS

| | | |
|---|---|---|
| 1,591,081 | Curtis | July 6, 1926 |
| 1,719,462 | Clausen | July 2, 1929 |
| 1,793,772 | Bouma | Feb. 24, 1931 |
| 2,101,121 | Wixon | Dec. 7, 1937 |
| 2,298,618 | Garity | Oct. 13, 1942 |
| 2,967,912 | Perello | Jan. 10, 1961 |